United States Patent Office 3,562,180
Patented Feb. 9, 1971

3,562,180
METALLIC SALTS OF MIXED ACIDS AS STABILIZERS FOR RIGID VINYL RESIN COMPOSITIONS
Edward L. White, Freehold, and William D. Lang, Rahway, N.J., assignors to National Lead Company, New York, N.Y., a corporation of New Jersey
No Drawing. Filed July 31, 1968, Ser. No. 748,945
Int. Cl. C08f 45/62
U.S. Cl. 252—400         8 Claims

ABSTRACT OF THE DISCLOSURE

Lead salts of mixed saturated monocarboxylic aliphatic acids containing from 8 to 14 carbon atoms, lead salts coformed with alkaline earth salts of said mixed acids and process therefor, as stabilizers for rigid vinyl halide resin compositions.

BACKGROUND OF THE INVENTION

In the processing of flexible vinyl halide resin compounds, the presence of plasticizers aids in the homogeneous dispersion of various additives such as lead monocarboxylate stabilizers. In addition, relatively low temperatures are employed in flexible vinyl processing. Because of the ease of dispersion and the low temperatures employed, good and efficient stabilizer activity is not difficult.

Disadvantages appear, however, when additives such as the lead monocarboxylate stabilizers are employed in rigid vinyl halide resin compounding where higher temperatures demand greater dispersion efficiency than is necessary in a flexible system. Plasticizers, though not generally used in rigid vinyl processing, may be present in small amounts. However, the highest levels at which the plasticizers can be tolerated in the rigid system are well below those at which stabilizer dispersion is facilitated. Consequently, it is necessary to subject the compound to intensive mixing at temperatures of about 100° C. to fully disperse the stabilizer in the resin. The absence of plasticizers to aid dispersion together with the rigorous rigid vinyl halide processing conditions create a demand for stabilizers of increased efficiency. One example where such increased efficiency in dispersion is particularly necessary is in extrusion and injection molding processes where it is necessary to protect the resin particles against thermal shock in the feeder section of the screw before a plastic melt is formed and shear can be developed to facilitate dispersion.

Low melting solid monocarboxylate salt stabilizers of low melt viscosity would be ideal in rigid processing for easy handling and ease of dispersibility in the resin compound during the intensive mixing of dry blend preparations. Heretofore, however, such low melting, low melt viscosity stabilizers have been unavailable.

Stabilizers in the form of viscous liquids, high melting solids and low melting solids with high melt viscosities have been available but have been generally unsatisfactory. For instance, lead caprylate is a low melting solid, easy to handle, not requiring plasticizers or solvent diluents but it has a high melt viscosity. This high melt viscosity increases the difficulty of its dispersion in the resin compound. An additional problem is encountered with lead caprate which has both a higher melt viscosity and a higher melting point than even the lead caprylate.

In evaluating various lead monocarboxylate stabilizers for rigid vinyl applications, it is also very important to consider their effect on the fusion characteristics of the vinyl compound. Generally, long chain lead soaps prolong the period required to develop the plastic melt. If used at low concentrations to avoid fusion difficulties, stabilization is not optimum. Even lead caprate which is a short chain lead soap has been found to adversely affect resin fusion characteristics.

SUMMARY OF THE INVENTION

In light of the foregoing, an object of this invention is to provide novel products, process for making, and use in rigid vinyl halide resin compositions, of stabilizers which have the advantages of being low melting solids of low melt viscosity with good compatibility and wetting properties and which lubricate without adversely affecting fusion characteristics. Other objects and advantages will become apparent from the following more complete description and claims.

It has been found that lead salts of mixed saturated monocarboxylic aliphatic acids of 8 to 14 carbon atoms are very effective stabilizers and have low melting points, low melt viscosities and do not adversely affect the fusion characteristics of the rigid vinyl resins. It has also been found that the fusion characteristics can be improved, with no loss in stability, by conforming alkaline earth metal salts with the lead salts of the mixed acids.

The novel compositions of this invention provide stabilizers for rigid vinyls which meet the requirements of easy handling, ready dispersibility and high stabilizing activity. The novel stabilizers are low melting, low melt viscosity solids which display excellent compatibility and wetting properties and which lubricate without adversely affecting the fusion characteristics of the resin into which they are incorporated. These highly desirable performance characteristics markedly enhance resin processibility and add to overall stabilizer effectiveness.

Broadly, then, this invention contemplates novel and highly effective stabilizers for rigid vinyl resin compounds comprising lead salts of mixed saturated monocarboxylic acids of 8 to 14 carbon atoms, alone, or coformed with alkaline earth metal salts, preferably calcium salts, of said acids; together with the process for making such salts and their use as stabilizers in rigid vinyl resin compositions.

It is very important that the relative weight ratios of the various components of the acid mixtures be controlled so that the stabilizers will, in addition to maintaining good stabilizing efficiency, display the advantages of being low melting solids of low melt viscosity, good compatibility and wetting properties and which will lubricate without adversely affecting fusion. The relative weight ratios will vary depending on the chain length of the acid, the physical form of the acid, the conditions under which the resin will be processed, the additives to be incorporated into the resin and other factors obvious to those skilled in the art.

DESCRIPTION OF THE PREFERRED EMBODIMENTS

It has been found most advantageous that the lead salts of the mixed acids have melting points between about 50°–100° C. and a melt viscosity at 100° C. of below about 3500 poises. The various components of the acid mixtures must be carefully controlled to produce lead salts which melt within these limits and which display such low melt viscosities. It has been found generally that at least about 25% by weight of the mixed acids should consist of at least one straight chain acid of 8 to 10 carbon atoms, i.e. caprylic, pelargonic and capric acids. The balance, if any, of the acid mixture will contain up to about 75% of one or a combination of the following acids in these percentages: 2-ethylhexoic, $C_8$ acid, from 0% to about 10%; lauric, $C_{12}$ acid, from 0% to about 75%; myristic, $C_{14}$ acid, from 0% to about 30%.

When lead is coformed with one or a combination of alkaline earth metal salts, the acids are employed in the same weight ratios to give coformed salts also melting between about 50°–100° C. The coformed salts markedly improve fusion characteristics with no loss in heat stability despite the reduced lead content.

In the practice of this invention, it is preferred to employ caprylic and capric acids and to make the normal lead salts thereof by reacting lead oxide (litharge) with said acids, heating, and stirring to complete the reaction. The alkaline earth metal portion of the coformed salts may be derived from an alkaline earth metal containing compound such as the oxides and hydroxides thereof. It is preferred that hydroxides be employed in the process of this invention.

When the lead salts are coformed with alkaline earth metal salts, it is also preferred that the acid mixture be caprylic and capric acids. Calcium is the preferred alkaline earth metal but other alkaline earths such as barium, magnesium and strontium may be employed in place of or in combination with calcium. With the preferred reactants, a novel but simple and convenient manner for providing the coformed metallic salts comprises reacting calcium hydroxide and lead oxide (litharge) with the mixed caprylic and capric acids, stirring, heating and coforming normal lead and calcium salts of the mixed acids. It is believed that the novel homogeneous stabilizer compositions thus formed comprise: lead caprylate, lead caprate, lead caprylate-caprate, calcium caprylate, calcium caprate and calcium caprylate-caprate. Good results have been achieved by employing mixed caprylic and capric acids in the weight ratios of about 55–60:45–40, respectively.

The use of mixed acids in forming and coforming lead and lead, alkaline earth metal salts thereof provides a proportion of lead salts having two dissimilar organic radicals bonded to the same lead atom. Without wishing to be bound hereby, it is believed tht the dissimilar organic radicals bonded to the same lead atom may account for the heretofore unavailable balance of properties which are characteristic of the novel stabilizer products of this invention.

The stabilizer compositions of this invention are useful alone or in combination with other stabilizers in polymeric vinyl halide and copolymeric vinyl halide-vinyl acetate resin compositions. Used alone, the compositions may be employed effectively at levels of between about 0.25% to 10% by weight of the resin. With such stabilizers as the basic lead salts of organic and inorganic acids, for instance, tribasic lead sulfate and tetrabasic lead fumarate, the relative levels of use will vary according to process and product requirements. However, generally, the stabilizers of this invention should constitute at least about 5% by weight of the total stabilizer.

It will be a matter of comparatively simple experimentation to determine the ranges of the various components which will produce a substantially homogeneous product similar in effectiveness to the preferred embodiment herein more fully described. In this connection, the product should have a melting point within the range of about 50° C. to 100° C. to display the handling advantages of a solid and the stabilizer availability of a liquid to penetrate and protect the resin particles during dry blending and subsequent processing. In order to more fully illustrate the matter of this invention and to more fully explain the parameters and conditions for the formulation and use of the novel products of this invention, the following examples are presented.

Example I

A fused normal lead salt of mixed caprylic-capric acid in a weight ratio of 60:40 respectively was made in the following manner: 692.51 grams of the mixed acid (acid value=361.3) was heated with agitation to 85° C. Then, 497.67 grams of litharge (lead oxide) was added to the stirred acid in 30 minutes while gradually raising the temperature to 120° C. Stirring was continued for one hour at 118° C.–120° C. and the tan melt was transferred to a shallow Pyrex tray to cool. The cooled, solidified product was then hammer milled through a 1/16″ screen.

Example II

A fused normal lead salt of mixed caprylic-capric acid in a 55:45 weight ratio was made by heating 241.91 grams of the mixed acid (acid value 357.34) with agitation to 83° C. Then, 171.97 grams of litharge was added to the stirred acid in 13 minutes while gradually raising the reaction temperature to 116° C. Stirring was continued for 45 minutes at 116–123° C. and the tan melt was transferred to a shallow Pyrex tray to cool. The cooled, solidified product was then hammer milled through an 0.030″ screen.

Example III

Into a 3 gallon pebble mill was placed 757.21 grams of mixed caprylic-capric acid in a weight ratio of 60:40, 3000 ml. deionized water, and 183.87 grams of 98.38% calcium hydroxide. Flint stones were added and the mixture was tumbled on a roller rack for 19 hours at ambient temperature. The resultant white slurry had a pH of 5.75. The product was recovered by filtration, dried at 105° C., and hammer milled through an 0.030″ screen.

Example IV

With stirring, 281.64 grams of mixed caprylic-capric acid (60:40 weight ratio, acid value=361.3) was heated to 84° C. Then, 112.0 grams of litharge was added over a 7 minute period while raising the reaction temperature to 103° C. Stirring was continued for 8 minutes while cooling to 96° C. To the reaction mixture was added 30.40 grams of 98.38% calcium hydroxide over a period of 10 minutes while increasing the temperature to 108° C. The reaction product was then stirred for one hour at 108–128° C. and the resultant melt was poured into a shallow Pyrex tray to cool. The cooled, solidified product was hammer milled through an 0.030″ screen.

Example V

With stirring, 75.25 grams litharge was added to mixed lauric and 2-ethylhexoic acids, 119.13 grams and 11.75 grams respectively, which acid mixture had been heated to 80° C. The litharge was added over a 95 minute period while the temperature was raised to 119° C. Stirring was continued for an additional one half hour and the temperature was maintained at 119°–120° C. The product was then cooled and hammer milled through a 1/16″ screen. The low melting solid of low melt viscosity displayed good stabilizing characteristics in a rigid vinyl halide resin composition.

Example VI

With stirring, 122.90 grams of mixed caprylic and myristic acids, 70:30 weight ratio, was heated to 62° C. Then, five increments of 11.98 grams of each of litharge were added at ten minute intervals and the temperature reached 96° C. Ten minutes after the last increment, the first of 6 smaller 4.0 gram increments were added. Increment additions were at 10 minute intervals. The batch was then heated at 120° C. for 45 minutes and was then cooled and hammer milled through a 1/16″ screen. The low melting solid of low melt viscosity displayed good dispersion and wetting characteristics as well as good stabilizing efficiency in a rigid vinyl halide resin composition.

Example VII

With stirring, 239.38 grams of mixed caprylic and capric acid, 60:40 ratio by weight (acid value=361.31), was heated to 82° C. Then, 95.21 grams of litharge was added over a 20-minute period while raising the reaction temperature to 110° C. and stirring was continued for 15 minutes while holding 110–114° C. To this reaction mixture, 25.92 grams of 98.35% calcium hydroxide was added over a period of 10 minutes and stirring was continued for an additional 5 minutes at 118–120° C. Next, 20.0 grams of stearyl alcohol was added to the molten salts and the temperature dropped to 104° C. Stirring was contiuued for 10 minutes at 104–105° C. and then 40.0 grams of spermaceti wax was added in 2 minutes and the temperature of the melt dropped to 90° C. The total composition was finally stirred for 45 minutes while regaining 108° C. and the melt was transferred to a shallow Pyrex tray to cool. The cooled, solidified product was pulverized with a mortar and pestle. The product contained 55% mixed lead soaps of caprylic and capric acids, 30% mixed calcium soaps of caprylic and capric acids, 10% spermaceti wax and 5% stearyl alcohol. Melting point was 71° C. and melt viscosity was 100 poises at 100° C.

Performance evaluations conducted on the products made by various of the procedures exemplified above are explained and tabulated below.

TO DEMONSTRATE LOW MELT VISCOSITIES

Samples of the lead salts listed in Table I were placed in 4 ounce jars which were then placed in an oil bath maintained at 100° C. Viscosities were determined with a Brookfield Viscometer Model RVF using spindle No. 7 at a speed of 2 r.p.m. Melting point and viscosity data are given below.

TABLE 1

| Lead salt | Melting point degrees centigrade | Viscosity at 100° C. in poises |
| --- | --- | --- |
| Lead 2-ethylhexoate | <25 | 20 |
| Lead caprylate | 59–63 | 4,900 |
| Lead caprate | 83–87 | 7,600 |
| Lead laurate | 83–97 | >20,000 |
| Lead myristate | 104–106 | |
| Lead stearate | 105–110 | |
| Dibasic lead stearate | >250 | |
| Lead salts of mixed caprylic and capric acids (60:40); Example I, above | 63–65 | 680 |
| Lead salts of mixed caprylic and capric acids (55:45); Example II, above | 50–65 | 460 |

These data show that the melt viscosity at 100° C., which temperature approximates that developed during intensive dry blend mixing of rigid vinyl compounds, for the lead salts of mixed caprylic and capric acids, is significantly lower than that of the individual lead caprylate and lead caprate salts. Only lead 2-ethylhexoate has a lower melt viscosity. This, however, is a viscous liquid at room temperature and accordingly presents handling difficulties. The products made according to Examples I and II have melting points which give them handling advantages of solids and the easy resin dispersibility of low viscosity liquids.

TO DEMONSTRATE POWDER HEAT STABILITY ADVANTAGE

To compare the heat stability different stabilizers impart to rigid powder blends the following procedure was employed: 388 grams of PVC resin, Geon 103 EP F7 (B. F. Goodrich Chemical Co.), 12 grams of acrylic processing aid, Acryloid K–120N (Rohm and Haas), and 6 grams of stabilizer were placed in the mixing jar assembly of a Ronson blender. Then, the mixing jar assembly was placed upon the drive-hot plate assembly which had been adjusted to a temperature of 250° F. The external heat supplied by the hot plate is necessary to compensate for conductive and radiational heat losses of frictional heat developed during high speed blending. The plastic dry blend composition was blended for 5 minutes at a rotor speed of about 6500 r.p.m. The plastic dry blend reached a temperature of about 100° C. during the 5 minute blending cycle. The contents were then removed from the mixing jar, spread out, and allowed to cool to room temperature.

To test the heat stability of the powder dry blends, about 25 grams of each composition was placed in individual small glass vials. These were placed in a forced draft circulating oven that had been adjusted to temperature of 175° C. The test specimen were removed after 30 mintues heat exposure and examined for extent of discoloration of the compound. Test results are as follows:

TABLE 2

| Stabilizer: | Powder color after 30 minutes at 175° C. |
| --- | --- |
| Lead 2-ethylhexoate | Dark Brown. |
| Lead caprylate | Cream with tan specks. |
| Lead caprate | Do. |
| Lead laurate | Light tan. |
| Lead stearate | Do. |
| Dibasic lead stearate | Dark brown. |
| Calcium caprylate | Brown. |
| Calcium caprate | Dark brown. |
| Calcium salts of mixed caprylic and capric acids (60:40) Examples III above | Pink-brown. |
| Calcium stearate | Light tan. |
| Lead salts of mixed caprylic and capric acids (60:40); Example I above | White. |
| Lead salts of mixed caprylic and capric acids (55:45); Example II above | Do. |

It is readily apparent that the lead salts of mixed caprylic and capric acids of the present invention provide the best stability to the dry blend. Their lower melt viscosities lead to more efficient distribution and dispersion during the dry blending, thus avoiding the cream discoloration with tan specks observed with the individual lead caprylate and lead caprate salts. They are also seen to be markedly better than the higher melting lead laurate, lead stearate and dibasic lead stearate as well as the calcium caprylate, caprate, stearate and coformed caprylate-caprate which calcium compounds have melting points above 150° C. Surprisingly, they are also significantly better than lead 2-ethylhexoate which is a viscous liquid at room temperature and has a low viscosity at 100° C.

TO DEMONSTRATE PROCESSING ADVANTAGES

Selected blends were then tested in a torque rheometer, C. W. Brabender Plasti-Corder Model PL–V32AA, using the oil heated Type 5 Roller Head. This instrument applies shear and heat to the compound and records on a chart changes in mixing torque (meter-grams) with time. Fusion of the plastic compound is shown by a peak torque, after which mixing torque decreases until equalibrium conditions are established. By removing small test specimens at 2½ minute intervals after fusion has occurred, the color stability time may be determined, i.e. the minutes after fusion that a color break occurs. As the test continues, the failure time may be determined. This is the minutes after fusion that the plastic turns deep brown or black, accompanied by massive cross-linking of the resin, and the evolution of hydrogen chloride, easly detected with moist litmus paper. Applying these tests to selected samples and using test conditions consisting of a mixing head temperature of 175° C., rotor speed of 33 r.p.m. and a plastic preblend charge of 62.5 grams, the following test results were obtained.

TABLE 3

| Stabilizer | Torque rheometer processibility (min.) | | |
|---|---|---|---|
| | Fusion | Color break | Failure |
| Lead 2-ethylhexoate | 3.0 | 9 | 9.5 |
| Lead caprylate | 6.5 | 14 | 14.2 |
| Lead caprate | >15 | | |
| Lead laurate | >15 | | |
| Lead stearate | >15 | | |
| Calcium salts of mixed caprylic and capric acids (60:40); Example III above | 1.5 | <5 | 11.0 |
| Calcium stearate | 1.2 | <5 | 8.8 |
| Lead salts of mixed caprylic and capric acids (60:40); Example I above | 6.5 | 14 | 14.5 |

These data show that as the chain length of the organic acid portion of the lead salt is increased, processibility changes and the time necessary to fuse the compound increases. Each stabilizer present at the equivalent of only 1.5 parts per hundred parts of resin compound. With lead caprate at this level, fusion did not occur even after 15 minutes of mixing. The same was true for lead laurate and lead stearate.

Fusion occurred in 6.5 minutes with the lead salts of mixed caprylic and capric acids. This was equivalent to the fusion time with lead caprylate despite the fact that there was 40% of caprate component in the coformed salt. Time to color break was also equivalent. These evidences of good stability together with the melt viscosity and powder heat stability advantages shown in Tables 1 and 2 point toward the excellent balance of properties available with the novel products of this invention. It is also to be noted that the calcium salts which provide slightly better fusion times, are significantly inferior to the novel products in heat stabilizing properties.

Fast fusion is desirable in certain applications such as high speed pipe extrusions and in injection molding as well as in compounds containing high molecular weight vinyl halide resins. It has now been found that the fusion times of a poly vinyl halide stabilized with lead salts of mixed caprylic and capric acids can be decreased by coforming both lead and calcium salts. With the resultant composition, there is no sacrifice in heat stability, in spite of the reduced lead content. The coforming of lead and calcium salts has an added advantage in that the total composition may be made by the more economical fusion process. If prepared individually, the lead salts can be made by heating the mixed acids with litharge; however, with the calcium salts, excessively high temperatures are required for fusion and the process is not practical.

Coforming lead and calcium salts of mixed caprylic and capric acids made in Example IV above have a melting point of 82°–90° C. and a melt viscosity at 100° C. of 6,600 poises. Contrasted to this, a mixture of individually prepared lead caprylate (39%), lead caprate (26%), calcium caprylate (21%) and calcium caprate (14%) had a melting range of 80–100° C. and a melt viscosity at 100° C. of 18,300 poises. This is nearly three times the viscosity of the coforming composition.

These two compositions, (6 grams each), were evaluated and compared by incorporating them into a polyvinyl chloride (PVC) dry blend compound as generally described in the text accompanying Table 2 above. Each powder blend was then subjected to the 30 minute heat test at 175° C. The PVC dry blend containing the individually prepared lead and calcium salts of the individual caprylic acids was tan in color. The PVC dry blend containing the coformed lead and calcium salts of a mixture of caprylic and capric acids had only a light pink cast after the same exposure. Further tests were conducted in the Brabender Plasti-Corder torque rheometer as generally described in the text accompanying Table 3 above. Fusion of the coformed salts of the mixed acids took place in 2.4 minutes, the color break occurred 14 minutes after fusion, and complete failure 14.1 minutes after fusion. Thus when compared to the compositions of Table 3 above, stabilized with the individual lead and calcium salts of mixed caprylic and capric acids, it is readily apparent that the coformed lead and calcium salts provide much better stability than the calcium salts alone and faster fusion than the lead salts alone with equally good stability.

MODIFIED COFORMED LEAD AND CALCIUM SALTS OF MIXED CAPRYLIC AND CAPRIC ACIDS

It has also been found that the characteristics of the coformed lead and calcium salts of mixed caprylic and capric acids are further markedly enhanced by their homogeneous dispersion and coassociation with additives such as waxes, alcohols and plasticizers, either alone or in combination. These additives combine with the metal salts in the reaction vessel to form homogeneous, mono-phase stabilizer compositions which, as can be seen below, provide a 3½ to 66 fold reduction in melt viscosity. It has also been found that these additives cause no adverse effects on the fusion characteristics of the resin composition.

TABLE 4

| Composition [1] | Melt viscosity at 100° C. in poises |
|---|---|
| 100% lead and calcium salts of mixed caprylic and capric acids (Example IV above) | 6,600 |
| 85% lead and calcium salts of mixed caprylic and capric acids, 15% spermaceti wax | 360 |
| 85% lead and calcium salts of mixed caprylic and capric acids, 15% stearyl alcohol | 100 |
| 85% lead and calcium salts of mixed caprylic and capric acids, 10% spermaceti wax, 5% stearyl alcohol (Example VII above) | 100 |
| 85% lead and calcium salts of mixed caprylic and capric acids, 15% paraffin wax | 600 |
| 85% lead and calcium salts of mixed caprylic and capric acids, 15% dicyclohexyl phthalate | 700 |

[1] Ratio of caprylic:capric=60:40 by weight; ratio of lead portion to calcium portion=65:35 by weight.

Any wax may be employed which melts below about 125° C. and above about 46° C. to 48° C. such as spermaceti, paraffin, castor wax, chlorinated paraffin wax and the like. Operable alcohols are those which melt above about 46° C. to 48° C. and which boil at about 200° C. and above such as stearyl alcohol and cetyl alcohol. Plasticizers which may be employed are those which melt at between about 46° C. to 48° C. up to 100° C. such as triphenyl phosphate, dicyclohexyl phthalate and the like. Quantities of these additives individually or in combination should be kept below about 20% by weight of the stabilizer composition so as not to effect stabilizer efficiency.

COFORMED LEAD AND CALCIUM SALTS WITH OTHER STABILIZERS

The utility of the stabilizers of the present invention in combination with conventional commercial stabilizers such as tribasic lead sulfate and tetrabisic lead fumarate (sold by the National Lead Company, respectively, as "Tribase" and "Lectro 78") was shown in the following manner. Varying levels of these commercial stabilizers, either alone or in combination with the stabilizers of this invention, were dry blended with PVC resin (388 grams) and processing aid (12 grams) as described above and tested in the Brabender torque rheometer as described in the text accompanying Table 3 above. The results are as follows:

TABLE 5

| Stabilizer | Grams | Torque rheometer processibility (min.) | | |
|---|---|---|---|---|
| | | Fusion | Color Break | Failure |
| Tribasic lead sulfate | 6 | 1.1 | 4 | 13.2 |
| Tribasic lead sulfate plus the coformed lead salt of Example I | 3+3 | 2.5 | 16 | 16.7 |
| Tribasic lead sulfate | 12 | 1.2 | 5 | 24.8 |
| Tribasic lead sulfate plus the coformed lead and calcium salt of Example IV | 6+6 | 1.4 | 39 | 39.6 |
| Tetrabasic lead fumarate plus the coformed lead and calcium salt of Example IV | 6+6 | 1.4 | 44 | 45.5 |

These data show the marked advantages of the stabilizers of the present invention used in combination with commercial basic lead stabilizers, over the stability provided by the basic lead salts used alone, even at higher levels. For instance, these data show that at the same overall levels, compounds stabilized with a commercial stabilizer in combination with the novel coformed lead and alkaline earth metal salts of mixed acids give markedly increased times to color break and failure compared to the commercial stabilizers alone. The comparison of time to color break at the 6 gram level for instance, represents a fourfold improvement. At the 12 gram level, more than an eightfold improvement is shown in time to color break. Furthermore, the combination stabilizer protects the resin compound from failure for about 60% longer than does the commercial tribasic lead sulfate stabilizer alone at the 12 gram level (39.6 minutes versus 24.8).

IN VYNW POLY (VINYL CHLORIDE-VINYL ACETATE) COPOLYMER

The dry blend preparation and test procedures employed above were used to prepare and test compounds based up Vinylite VYNW-5 poly (vinyl chloride-vinyl acetate) copolymer (Union Carbide). The formulations and test results are given below:

TABLE 6

|  | A | B |
|---|---|---|
| Formulation: | | |
| Vinylite VYNW | 400 | 400 |
| Tribasic lead sulfate | 12 | |
| Coformed lead and calcium salts of mixed caprylic and capric acids Example IV, above | | 12 |
| Torque rheometer processibility (minutes): | | |
| Fusion | 5.0 | 3.3 |
| Color break | 3 | 14 |
| Failure | 14.2 | 16.2 |

These data also show the utility of the coformed lead and calcium salts of this invention. For instance, the fusion time was decreased by almost 2 minutes and the resistance to color break was increased nearly fivefold. The time to compound failure was also increased with the coformed product of this invention over the commercial tribasic lead sulfate stabilizer alone.

We claim:

1. A stabilizer for rigid vinyl halide resin compositions having a melting point between about 50°–100° C. and a melt viscosity at 100° C. of below about 3500 poises, comprising, lead salts of mixed saturated aliphatic monocarboxylic acids having from 8 to 14 carbon atoms wherein about 25% to 100%, by weight of said mixed acids, consists of at least one straight chain acid having from 8 to 10 carbon atoms and from 0% to about 75% consists of an acid selected from the group consisting of:

(a) up to about 10% 2-ethylhexoic;
(b) up to about 75% lauric;
(c) up to about 30% myristic; and
(d) combinations thereof.

2. The stabilizer of claim 1, wherein the mixed acids are caprylic and capric acids in the weight ratio of about 55–60:45–40, respectively.

3. A stabilizer for rigid vinyl halide resin compositions having a melting point between about 50°–100° C., comprising, coformed lead and an alkaline earth metal salt of mixed saturated aliphatic monocarboxylic acids having from 8 to 14 carbon atoms wherein about 25% to 100%, by weight of mixed acids, consists of at least one straight chain acid having from 8 to 10 carbon atoms and from 0% to about 75% consists of an acid selected from the group consisting of:

(a) up to about 10% 2-ethylhexoic;
(b) up to about 75% lauric;
(c) up to about 30% myristic; and
(d) combinations thereof.

4. The stabilizer of claim 3, wherein at least one alkaline earth metal salt is a calcium salt and the mixed acids are caprylic and capric acids in the weight ratio of about 55–60:45–40, respectively.

5. A method for making a stabilizer comprising reacting litharge with mixed saturated monocarboxylic aliphatic acids having from 8 to 14 carbon atoms, heating, and forming lead salts of said mixed acids.

6. The method of claim 5, wherein said mixed aliphatic acids are caprylic and capric acids in the weight ratios of 55–60:45–40, respectively.

7. A method for making a stabilizer comprising reacting at least one alkaline earth metal containing compound and litharge with mixed saturated monocarboxylic aliphatic acids having from 8 to 14 carbon atoms, heating, and coforming lead and alkaline earth metal salts of said mixed acids.

8. The method of claim 7, wherein said alkaline earth metal containing compound is calcium hydroxide and the mixed aliphatic acids are caprylic and capric, comprising reacting said calcium hydroxide and litharge with said mixed caprylic and capric acids in the weight ratios of 55–60:45–40, respectively.

References Cited

UNITED STATES PATENTS

| 3,169,116 | 2/1965 | Baseman et al. | 21—2.7 |
| 3,355,420 | 11/1967 | Friedman et al. | 252—400 |
| 3,365,403 | 1/1968 | Szczepanek et al. | 252—400 |
| 3,499,868 | 3/1970 | Roussos et al. | 252—400 |

RICHARD D. LOVERING, Primary Examiner

I. GLUCK, Assistant Examiner

U.S. Cl. X.R.

252—182; 260—23, 45.75, 435